(12) United States Patent
Tsuchiya et al.

(10) Patent No.: US 10,443,833 B2
(45) Date of Patent: Oct. 15, 2019

(54) LIGHT DEVICE

(71) Applicant: HONDA MOTOR CO., LTD., Tokyo (JP)

(72) Inventors: Yosuke Tsuchiya, Wako (JP); Yosuke Koike, Tokyo (JP)

(73) Assignee: HONDA MOTOR CO., LTD., Tokyo (JP)

(*) Notice: Subject to any disclaimer, the term of this patent is extended or adjusted under 35 U.S.C. 154(b) by 0 days.

(21) Appl. No.: 16/081,003

(22) PCT Filed: Mar. 9, 2017

(86) PCT No.: PCT/JP2017/009612
§ 371 (c)(1),
(2) Date: Aug. 29, 2018

(87) PCT Pub. No.: WO2017/169643
PCT Pub. Date: Oct. 5, 2017

(65) Prior Publication Data
US 2019/0032908 A1    Jan. 31, 2019

(30) Foreign Application Priority Data
Mar. 29, 2016  (JP) .................................. 2016-066502

(51) Int. Cl.
*F21V 23/00* (2015.01)
*F21V 29/10* (2015.01)
(Continued)

(52) U.S. Cl.
CPC ............ *F21V 29/10* (2015.01); *B60Q 1/0041* (2013.01); *B60Q 1/0058* (2013.01);
(Continued)

(58) Field of Classification Search
CPC .... F21V 23/006; F21Y 2017/60; F21K 9/238; F21K 9/278
(Continued)

(56) References Cited

U.S. PATENT DOCUMENTS

| 6,414,801 B1 * | 7/2002 | Roller | B60Q 1/0052 |
| | | | 359/726 |
| 2004/0120157 A1 * | 6/2004 | Bottesch | B60Q 1/0052 |
| | | | 362/487 |

(Continued)

FOREIGN PATENT DOCUMENTS

| CN | 203797516 | 8/2014 |
| CN | 204573618 | 8/2015 |

(Continued)

OTHER PUBLICATIONS

Taiwanese Office Action dated Apr. 20, 2018, 6 pages.
(Continued)

*Primary Examiner* — Christopher M Raabe
(74) *Attorney, Agent, or Firm* — Rankin, Hill & Clark LLP

(57) ABSTRACT

To provide a light device that can suppress the heat influence. In a tail light having LED chips, an electronic component that turns on the LED chips, and a first substrate, and a second substrate, and a third substrate on which the LED chips and the electronic component are disposed, a plurality of the first substrate, the second substrate, and the third substrate are independently provided, and are spaced from one another.

3 Claims, 6 Drawing Sheets

(51) Int. Cl.
- *B60Q 1/56* (2006.01)
- *F21V 19/00* (2006.01)
- *B60Q 1/00* (2006.01)
- *B60Q 1/26* (2006.01)
- *B62J 6/04* (2006.01)
- *F21V 29/15* (2015.01)
- *F21S 43/19* (2018.01)
- *F21S 43/14* (2018.01)
- *F21S 43/15* (2018.01)
- *F21S 43/20* (2018.01)
- *F21S 45/10* (2018.01)
- *F21S 45/47* (2018.01)
- *B60Q 1/30* (2006.01)
- *F21Y 107/60* (2016.01)
- *F21W 107/17* (2018.01)
- *F21W 103/10* (2018.01)
- *F21W 103/50* (2018.01)
- *F21Y 115/10* (2016.01)

(52) U.S. Cl.
CPC ......... *B60Q 1/2607* (2013.01); *B60Q 1/2696* (2013.01); *B60Q 1/30* (2013.01); *B60Q 1/56* (2013.01); *B62J 6/04* (2013.01); *F21S 43/14* (2018.01); *F21S 43/15* (2018.01); *F21S 43/19* (2018.01); *F21S 43/26* (2018.01); *F21S 45/10* (2018.01); *F21S 45/47* (2018.01); *F21V 19/00* (2013.01); *F21V 23/006* (2013.01); *F21V 29/15* (2015.01); *F21W 2103/10* (2018.01); *F21W 2103/50* (2018.01); *F21W 2107/17* (2018.01); *F21Y 2107/60* (2016.08); *F21Y 2115/10* (2016.08)

(58) Field of Classification Search
USPC .......................................................... 362/521
See application file for complete search history.

(56) References Cited

U.S. PATENT DOCUMENTS

| | | | |
|---|---|---|---|
| 2008/0049438 A1* | 2/2008 | Bloemen | B60Q 1/0052 362/540 |
| 2011/0002116 A1* | 1/2011 | Chen | F21V 7/0016 362/235 |
| 2011/0156583 A1* | 6/2011 | Chuang | F21V 3/00 315/32 |
| 2012/0112614 A1* | 5/2012 | Pickard | H05B 33/0803 313/46 |
| 2015/0260365 A1* | 9/2015 | Kitayama | B60Q 1/38 362/519 |

FOREIGN PATENT DOCUMENTS

| | | |
|---|---|---|
| JP | 2006-114249 | 4/2006 |
| JP | 2007-095504 | 4/2007 |
| JP | 2008-126708 | 6/2008 |
| JP | 2012-094380 | 5/2012 |
| JP | 2014-010942 | 1/2014 |
| JP | 2015-053233 | 3/2015 |

OTHER PUBLICATIONS

International Search Report dated Jun. 6, 2017 and Written Opinion, 10 pages.
International Preliminary Report on Patentability, PCT/JP2017/009612, dated Oct. 2, 2018, 10 pages.
European Search Report dated Oct. 17, 2018, 8 pages.

* cited by examiner ously, the appearance as the tail lamp
LIGHT DEVICE

TECHNICAL FIELD

The present invention relates to a light device.

BACKGROUND ART

There has been known a light device in which a plurality of light sources are disposed on a substrate (for example, see Patent Literature 1).

CITATION LIST

Patent Literature

[Patent Literature 1]
Japanese Patent Laid-Open No. 2007-95504

SUMMARY OF INVENTION

Technical Problem

Since in the light device disclosed in Patent Literature 1, a number of light sources are disposed on a sheet of substrate in a concentrated manner, the heat influence may be caused.

It is an object of the present invention to provide a light device that can suppress a heat influence.

Solution to Problem

The entire contents of Japanese Patent Application No. 2016-066502 filed on Mar. 29, 2016 are included in this specification.

To solve the above-described problem, an aspect of the present invention provides a light device comprising a light source (25, 26, 28), an electrical element (27) that turns on the light source (25, 26, 28), and substrates (15, 17, 19) on which the light source (25, 26, 28) and the electrical element (27) are disposed, a plurality of the substrates (15, 17, 19) are independently provided, and are disposed to be spaced from one another.

In the above-described configuration, the light device may include a column (16) to which the substrates (15, 17, 19) are fixed, and a partition portion (16b) that is fixed to the column (16), and is disposed between the plurality of substrates (15, 17, 19).

In the above-described configuration, the light device may include a housing (11) that supports the column (16), an outer lens (12) that, together with the housing (11), forms a housing portion (13) for housing the plurality of substrates (15, 17, 19), and an inner lens (18) that is provided inside the outer lens (12), and is disposed between the plurality of substrates (15, 17, 19) and supported by the column (16).

In the above-described configuration, the outer lens (12) may include a lens cut portion (12z) that is a part of the outer lens (12) and that has been subjected to lens cut processing, and the inner lens (18) may include a lens cut portion (18p) in a position that does not overlap with the lens cut portion (12z) of the outer lens (12) in a rear view.

In the above-described configuration, the outer lens (12) may be a tail lamp, and may include a light transmitting portion (12m) in a part of a bottom surface of the outer lens (12), the light transmitting portion (12m) transmitting light of the light source (28) to illuminate a license plate (50) attached to a rear portion of a vehicle body, and a boundary (11d2) between the light transmitting portion (12m) and a lower portion of the housing (11) may be located in front of an upper boundary (11d1) with respect to the vehicle body, the upper boundary (11d1) being provided between the outer lens (12) and the housing (11).

In the above-described configuration, in a rear view, the lens cut portion (12z) may be provided in a center portion of the outer lens (12), the lens cut portion (18p) may be provided in the inner lens (18) on both sides of the lens cut portion (12z) of the outer lens (12), and the substrate (19) disposed between the outer lens (12) and the inner lens (18) may be disposed on an inner side of a contour of the lens cut portion (12z) of the outer lens (12).

Advantageous Effects of Invention

According to an aspect of the present invention, since a plurality of substrates are independently provided, and are disposed to be spaced from one another, the plurality of substrates are separately located, which allows heat sources to be kept isolated so as to suppress the heat influence.

Since the light device includes the column that supports the substrates, and a partition portion that is fixed to the column and disposed between the plurality of substrates, provision of the partition portion allows for further isolation of the heat sources and further suppression of the heat influence.

Since the light device includes a housing that supports the column, an outer lens that, together with the housing, forms a housing portion for housing the plurality of substrates, and an inner lens that is provided inside the outer lens, and is disposed between the plurality of substrates and supported by the column, the inner lens can be utilized as a partition plate for the plurality of substrates, and isolation of the heat sources can be attained by the inner lens. In this way, the heat influence can be further suppressed. The inner lens also serves as a partition plate, and a support member becomes unnecessary as compared to the case where a special support member for the inner lens is additionally provided, which can reduce the number of components.

Since the outer lens includes a lens cut portion that is a part of the outer lens and that has been subjected to lens cut processing, and the inner lens includes the lens cut portion in a position that does not overlap with the lens cut portion of the outer lens in a rear view, the light emitted from the light device can be differentiated between the inner lens and the outer lens, thereby improving the visibility and giving the new impression.

The outer lens is a tail lamp, and includes a light transmitting portion in a part of a bottom surface of the outer lens, the light transmitting portion transmitting the light of the light source to illuminate the license plate attached to a rear portion of the vehicle body, and a boundary between the light transmitting portion and a lower portion of the housing is located in front of an upper boundary with respect to the vehicle body, the upper boundary being provided between the outer lens and the housing. Consequently, an area in which the license plate can be illuminated is increased, which enables good illumination for the license plate.

In a rear view, the lens cut portion is provided in the center portion of the outer lens, the lens cut portion is provided in the inner lens on both sides of the lens cut portion of the outer lens, and the substrate disposed between the outer lens and the inner lens is disposed on the inner side of the contour of the lens cut portion of the outer lens, which allows for miniaturization of the substrate and emission of the light from the light device with the light emitted from the light source to the lens cut portion of the outer lens being diffused, the light source being provided on the substrate disposed between the outer lens and the inner lens.

DESCRIPTION OF EMBODIMENTS

An embodiment of the present invention will be described below with reference to the drawings. Note that in the explanation, when directions such as front and rear, right and left, and upper and lower are mentioned, they are the same as directions with respect to a vehicle body of a motorcycle unless otherwise specially described. Also note that in the respective drawings, reference sign FR is indicative of a front side of the vehicle body, reference sign UP is indicative of an upper side of the vehicle body, and reference sign LH is indicative of a left side of the vehicle body.

Figure 1:
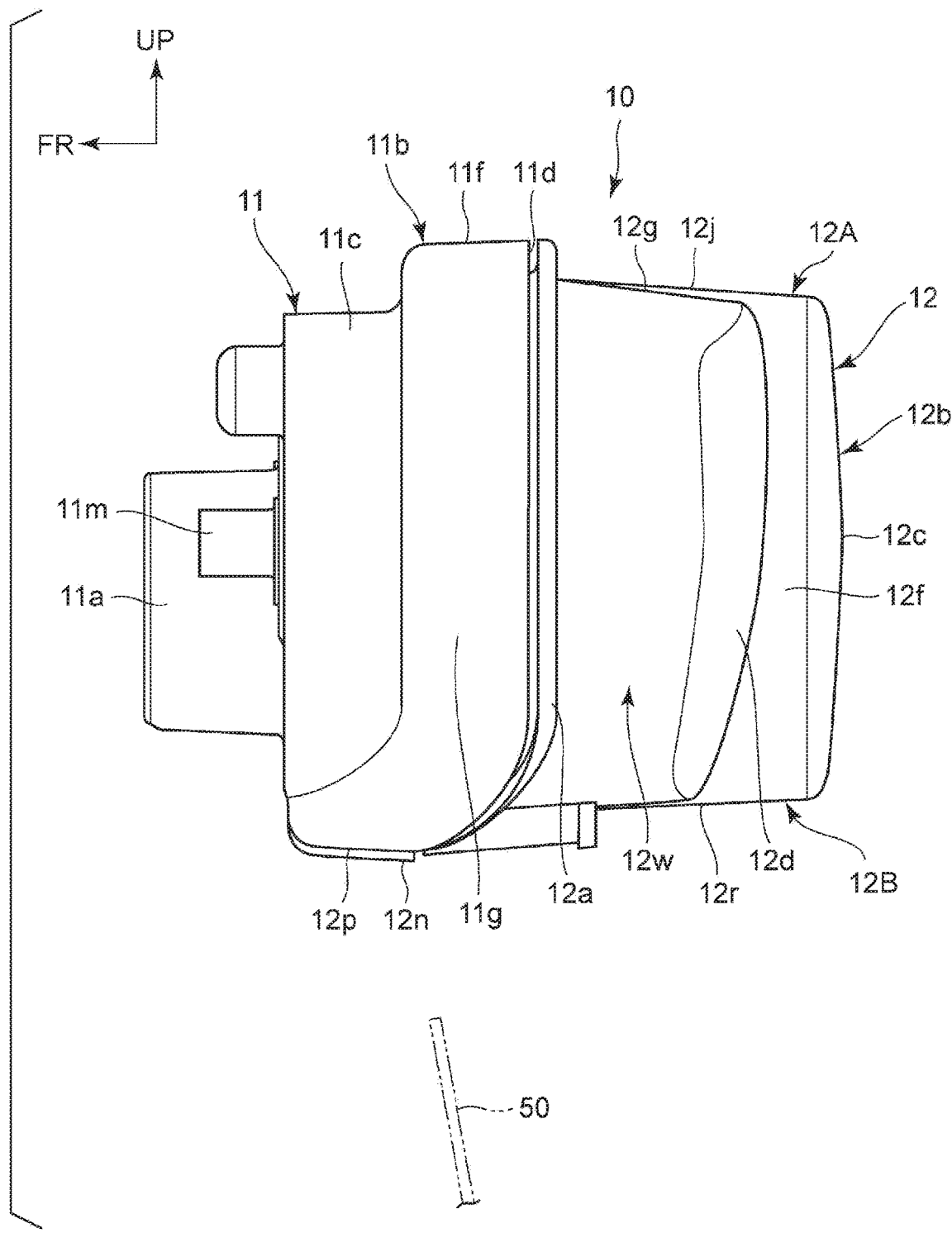
FIG. 1 is a left side view illustrating a tail light that is attached to a rear end portion of a motorcycle.

FIG. 1 is a left side view illustrating a tail light 10 that is attached to a rear end portion of the motorcycle.

The tail light 10 includes a housing 11 that is provided at a front portion of the tail light 10, and an outer lens 12 that is attached to a rear edge of the housing 11. The tail light 10 is attached to a rear portion of a vehicle, and has a function of causing the existence of the vehicle to be recognized by a driver of another vehicle behind the vehicle. The tail light 10 may also serve as a stop light that is turned on when a brake is operated.

The tail light 10 has a function of a license plate light that illuminates a license plate 50 disposed below the tail light 10.

The housing 11 is made of resin, and includes a connector attaching portion 11a to which a connector connected to wire harnesses for energization is attached, the connector attaching portion 11a being provided in a front portion of the housing 11. The outer lens 12 is made of colorless and transparent or colored and transparent resin, and is formed in a substantially rectangular shape in a side view. In a lower portion of the outer lens 12, a bonding portion of the outer lens 12 with the housing 11 extends forward toward the lower side. A flange 12a is formed around substantially the entire circumference at a front portion of the outer lens 12 except for the lower portion of the outer lens 12.

Figure 2:
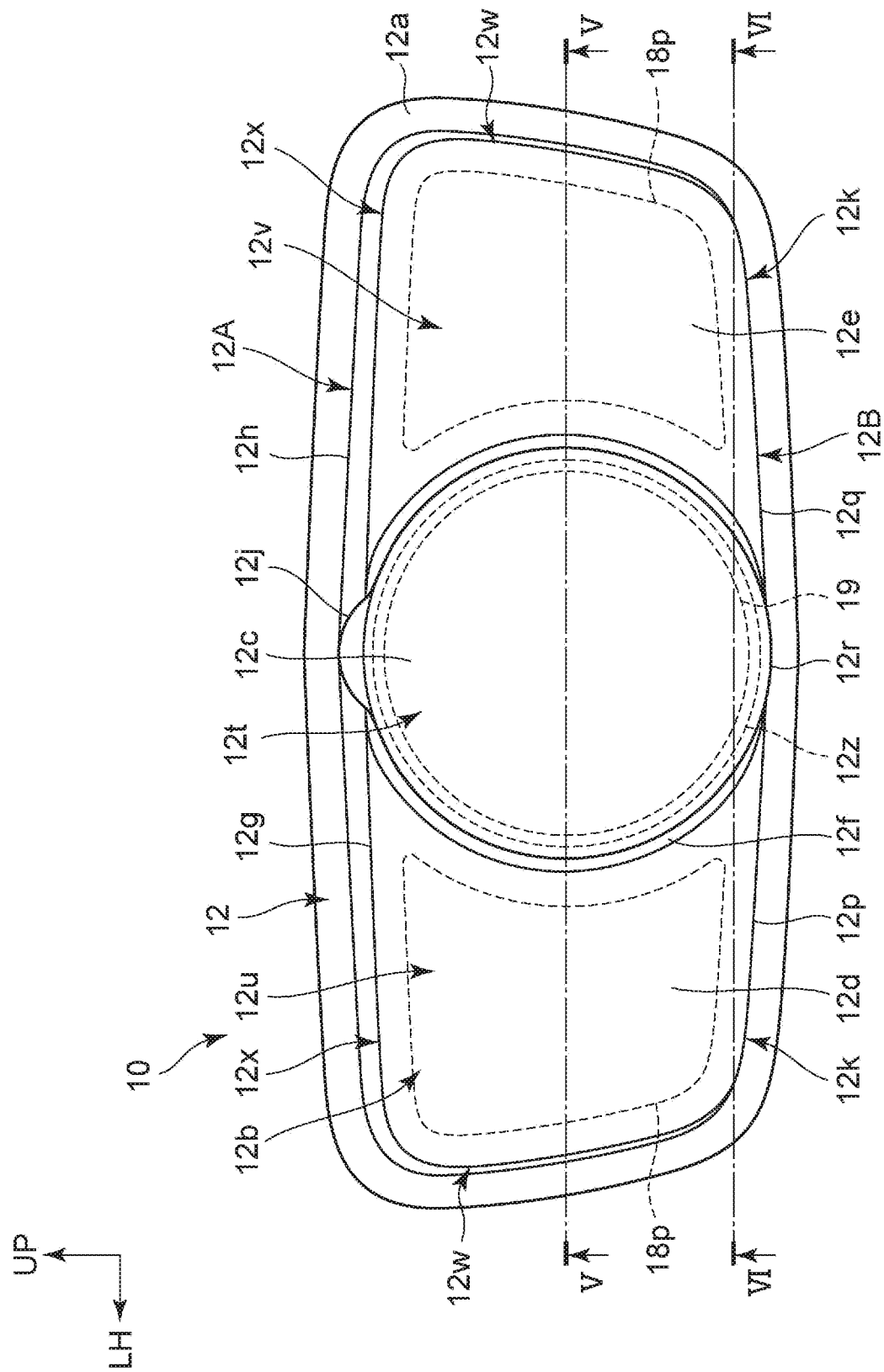
FIG. 2 is a rear view illustrating the tail light.

FIG. 2 is a rear view illustrating the tail light 10.

The tail light 10 is formed so that both left and right ends of the tail light 10 are inclined to be located gradually closer to the center side in the vehicle width direction toward the lower side so as to have a substantially laterally long rectangular shape as a whole in a rear view.

As illustrated in FIG. 1 and FIG. 2, the outer lens 12 includes a circular-shaped rear center surface portion 12c that is located at a center in the vehicle width direction of a rear surface 12b of the outer lens 12, and a rear-left surface portion 12d and a rear-right surface portion 12e (see FIG. 2) that are respectively located on a left side and a right side of the rear surface 12b with respect to the rear center surface portion 12c. The rear center surface portion 12c protrudes rearwardly beyond the rear-left surface portion 12d and the rear-right surface portion 12e.

The rear center surface portion 12c is curved so as to protrude rearwardly. The rear-left surface portion 12d and the rear-right surface portion 12e are curved so as to protrude rearwardly, and are formed to be located gradually forward toward the lower side.

Figure 3:
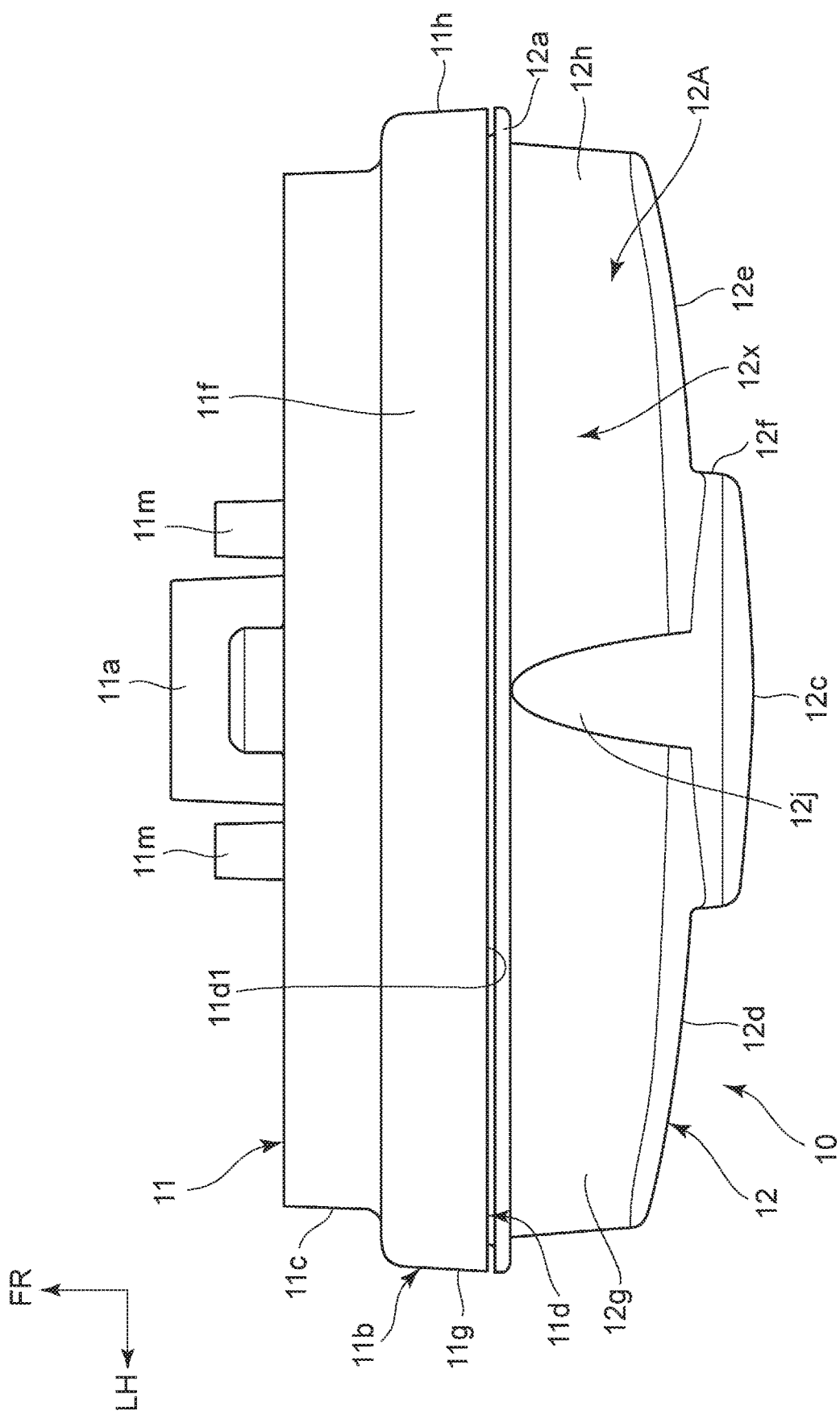
FIG. 3 is a plan view illustrating the tail light.

FIG. 3 is a plan view illustrating the tail light 10.

The housing 11 includes a wide width portion 11b into which the outer lens 12 is inserted, the wide width portion 11b being provided in a rear portion of the housing 11, and a forward extending portion 11c that is formed so that a width of the forward extending portion 11c is smaller than that of the wide width portion 11b in the vehicle width direction, and that extends forward from and is integrally formed with the wide width portion 11b.

The outer lens 12 includes a circumferential surface portion 12f that extends forward from a peripheral edge of the rear center surface portion 12c, and an top-left surface portion 12g and an top-right surface portion 12h that extend forward from an upper edge of the rear-left surface portion 12d and an upper edge of the rear-right surface portion 12e, respectively. The above-described circumferential surface portion 12f, top-left surface portion 12g, and top-right surface portion 12h forms a top surface 12A of the outer lens 12.

The circumferential surface portion 12f includes a top surface protrusion 12j that extends to protrude forward so as to be sandwiched between the top-left surface portion 12g and the top-right surface portion 12h. The top surface protrusion 12j is curved to protrude upwardly, and protrudes upwardly beyond the top-left surface portion 12g and the top-right surface portion 12h.

Figure 4:
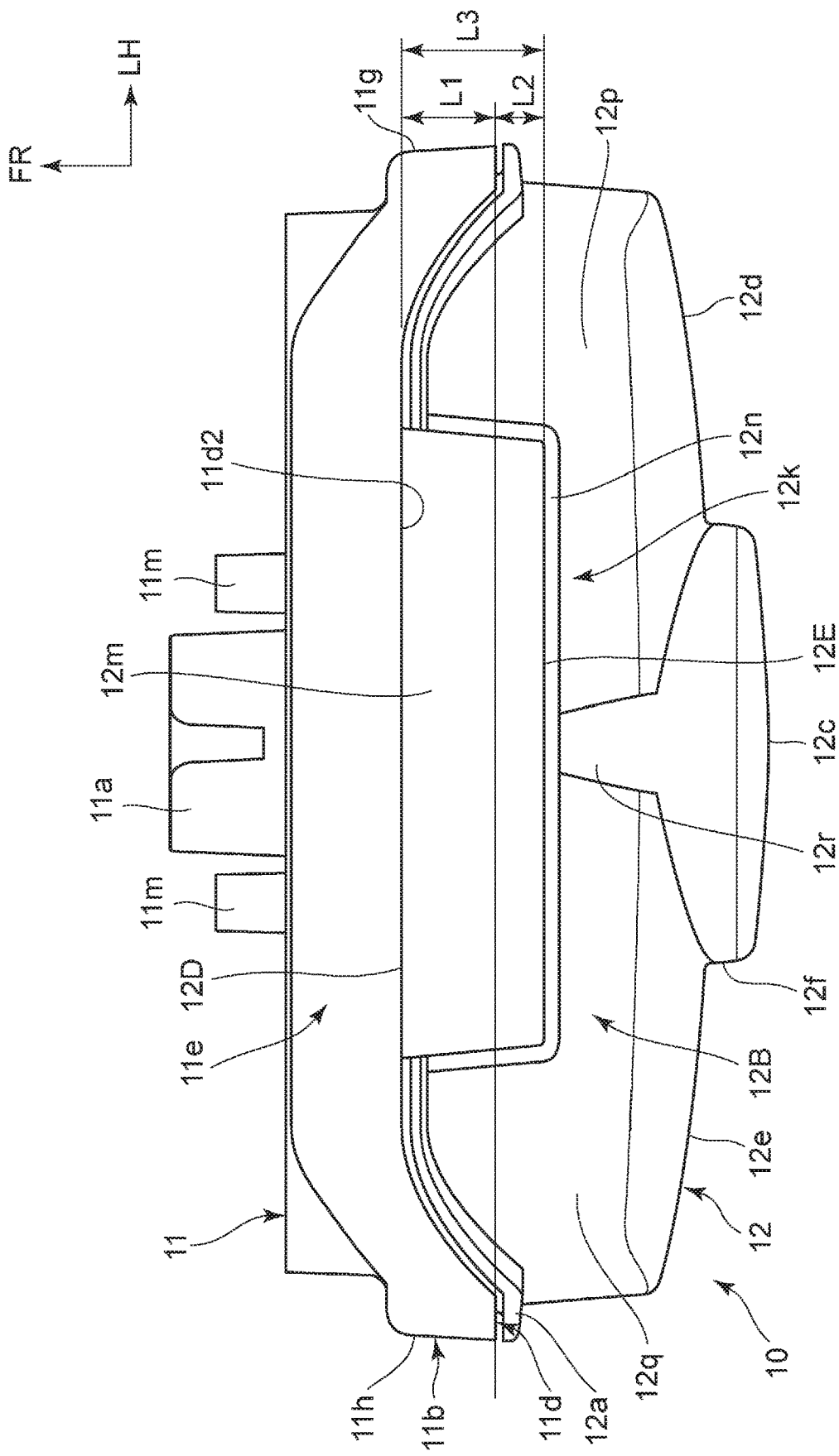
FIG. 4 is a bottom view illustrating the tail light.

FIG. 4 is a bottom view illustrating the tail light 10.

The wide width portion 11b of the housing 11 is formed so that a rear edge 11d of the wide width portion 11b is located gradually forward toward the lower side, and a bottom surface 11e of the wide width portion 11b extends linearly in the vehicle width direction. A distance in a front-rear direction between the rear edge 11d on a top surface 11f (see FIG. 3) side and the left and right side surfaces 11g, 11h sides of the wide width portion 11b and the rear edge 11d on the bottom surface 11e side is denoted by a distance L1.

The outer lens 12 is formed integrally with a trapezoidal light transmitting portion 12m at a center in the vehicle width direction of the bottom surface 12B of the outer lens 12. The light transmitting portion 12m is formed colorlessly and transparently, or white transparently so that a part of light in the tail light 10 is directed onto the license plate 50 (see FIG. 1) through the light transmitting portion 12m.

An edge thick portion 12n that is formed to be thick is formed around the light transmitting portion 12m to protrude downwardly beyond the light transmitting portion 12m and the bottom surface 12B.

A front edge 12D of the light transmitting portion 12m is in close contact with a rear edge 11d on the bottom surface 11e side of the wide width portion 11b, and the rear edge 12E of the light transmitting portion 12m is located rearwardly by a distance L2 from the rear edge 11d on the top surface 11f (see FIG. 3) side of the wide width portion 11b. Accordingly, a length in the front-rear direction of the light transmitting portion 12m is L3 (=L1+L2).

The outer lens 12 includes a bottom-left surface portion 12p and a bottom-right surface portion 12q that extend forward from a lower edge of the rear-left surface portion 12d and a lower edge of the rear-right surface portion 12e, respectively, and the bottom-left surface portion 12p and the bottom-right surface portion 12q extend to the flange 12a and the edge thick portion 12n. The above-described circumferential surface portion 12f, bottom-left surface portion 12p, and bottom-right surface portion 12q form the bottom surface 12B of the outer lens 12.

The circumferential surface portion 12f of the outer lens 12 includes a bottom surface protrusion 12r that extends to protrude forward so as to be sandwiched between the bottom-left surface portion 12p and the bottom-right surface portion 12q. The bottom surface protrusion 12r is curved to protrude downwardly, and protrudes downwardly beyond the bottom-left surface portion 12p and the bottom-right surface portion 12q.

Figure 5:
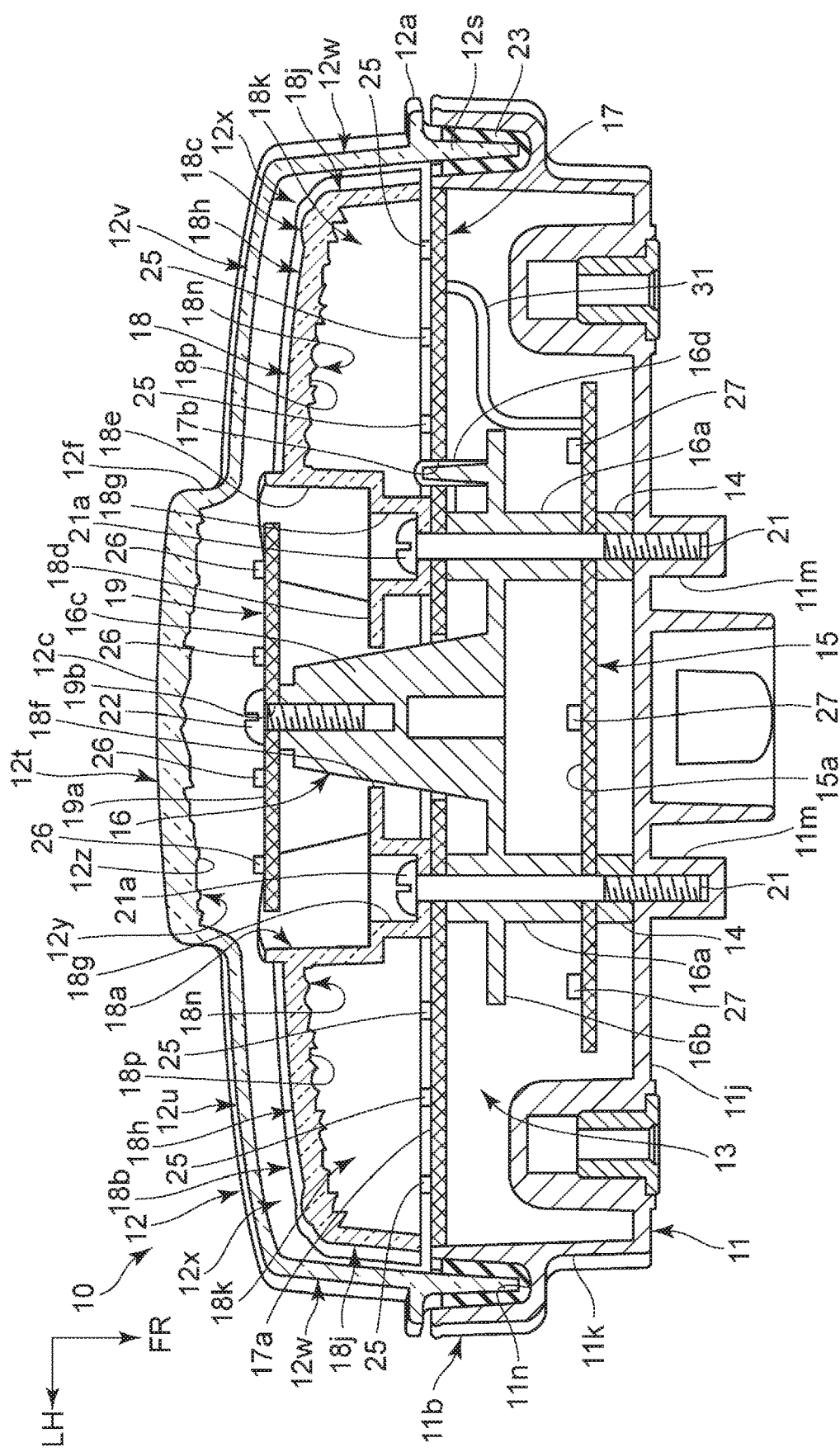
FIG. 5 is a cross-sectional view taken along line V-V of FIG. 2.
Figure 6:
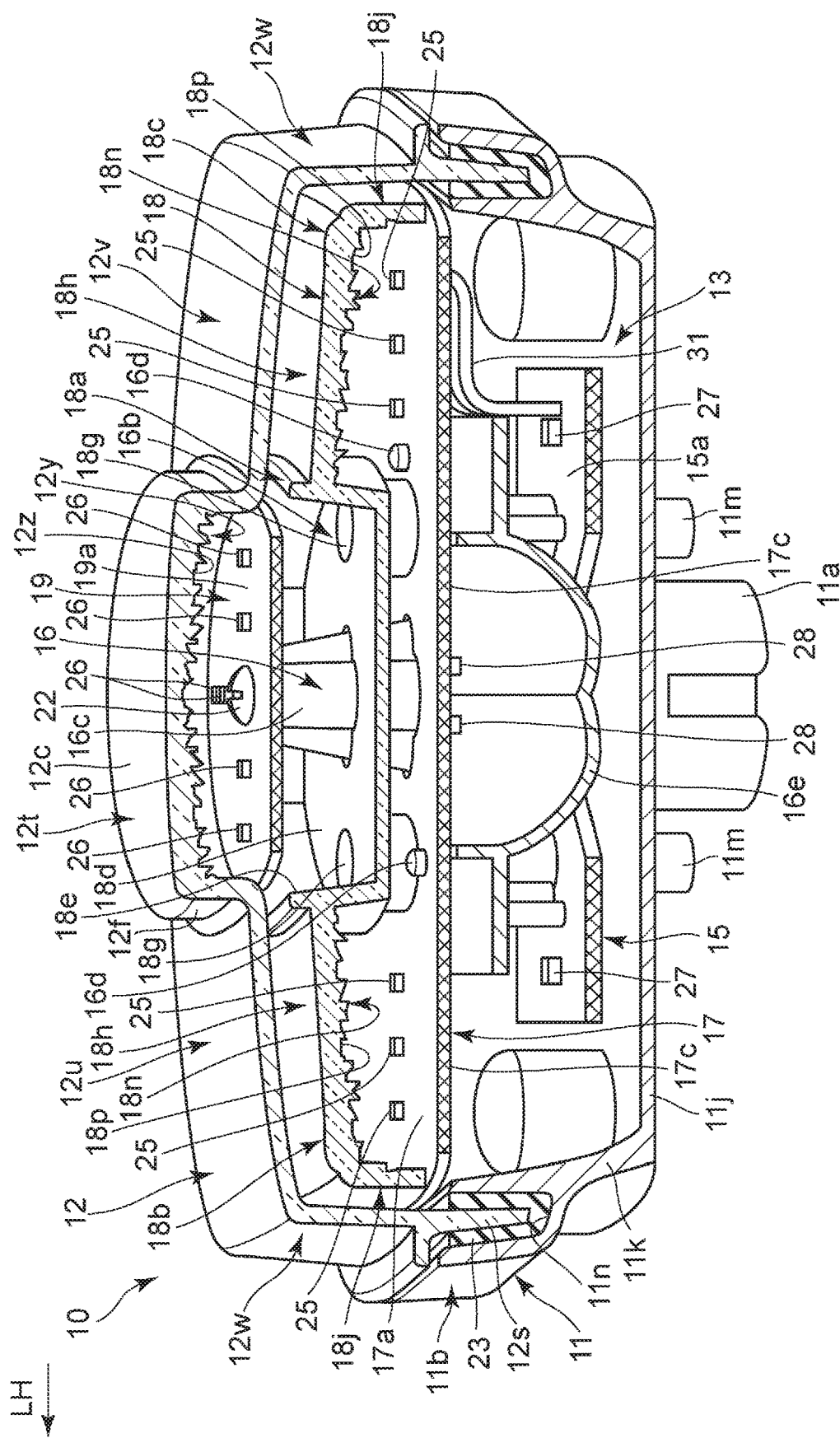
FIG. 6 is a cross-sectional view taken along line VI-VI of FIG. 2.

FIG. 5 is a cross-sectional view taken along line V-V of FIG. 2. FIG. 6 is a cross-sectional view taken along line VI-VI of FIG. 2.

As illustrated in FIG. 5, the housing 11 is comprised of a flat bottom wall 11j, and a peripheral wall 11k that extends upwardly from a peripheral edge of the bottom wall 11j, the bottom wall 11j and the peripheral wall 11k being formed integrally with each other.

A plurality of collars 14, a first substrate 15, a column 16, a second substrate 17 and an inner lens 18 are stacked on the bottom wall 11j of the housing 11, and the collars 14, the first substrate 15, the column 16, the second substrate 17 and the inner lens 18 are fixed to the bottom wall 11j with a plurality of screws 21. A third substrate 19 is fixed to a rear end of the column 16 with a screw 22. The cross sections of the above-described first substrate 15, second substrate 17, and third substrate 19 are indicated by cross-hatching.

The screws 21 are inserted into the plurality of collars 14, the first substrate 15, the column 16, the second substrate 17, and the inner lens 18, so as to be screwed into corresponding front boss portions 11m that are formed to protrude forward from the bottom wall 11j.

The wide width portion 11b is formed integrally with the peripheral wall 11k of the housing 11, and an annular fitting recess 11n is formed inside of the wide width portion 11b. An annular fitting portion 12s is inserted into the recess 11n through an annular sealing member 23 made of a rubber, the fitting portion 12s being formed in the peripheral edge of the outer lens 12. In this way, the sealability can be achieved in the bonding portion between the housing 11 and the outer lens 12 by the sealing member 23.

The outer lens 12 includes a center wall 12t, a left rear wall 12u, a right rear wall 12v, left and right side walls 12w, 12w, a top wall 12x (also see FIG. 3), and a bottom wall 12k (see FIG. 4).

The center wall 12t is provided with the rear center surface portion 12c and the circumferential surface portion 12f. The left rear wall 12u and the right rear wall 12v are disposed outwardly in the vehicle width direction of the center wall 12t. The left and right side walls 12w, 12w extend forward from side edges in the vehicle width direction of the left rear wall 12u and the right rear wall 12v, respectively. The top wall 12x includes the top surface 12A (see FIG. 3). The bottom wall 12k includes the bottom surface (see FIG. 4).

The outer lens 12 is formed in a recess shape by the center wall 12t, the left rear wall 12u, the right rear wall 12v, the side walls 12w, 12w, the top wall 12x and the bottom wall 12k.

A lens cut portion 12z that has been subjected to lens cut processing is provided in a front surface 12y of the center wall 12t. The lens cut portion 12z is a portion through which light emitted from a plurality of LED chips 26 is transmitted and that refracts the light in a predetermined direction. The light that has been transmitted through the center wall 12t including the lens cut portion 12z illuminates outside the tail light 10.

The above-described housing 11 and outer lens 12 form a sealed housing portion 13.

The first substrate 15, the second substrate 17, and the third substrate 19 are provided with a plurality of LED chips 25, 26 that serve as light sources of the tail light 10, and a plurality of electronic components 27 for turning on the plurality of LEDs 25, 26.

The first substrate 15 is provided with the plurality of electronic components 27, the second substrate 17 is provided with the plurality of LED chips 25, and the third substrate 19 is provided with the plurality of LED chips 26.

The first substrate 15 is formed in a flat plate shape, and is disposed at a distance from the bottom wall 11j of the housing 11 through the plurality of collars 14. The electronic components 27 are attached to a rear surface 15a of the first substrate 15. In this way, the first substrate 15 is separated from the bottom wall 11j to facilitate air flow generated around the first substrate 15 and thereby enhance the heat dissipation from the plurality of electronic components 27 that are attached to the first substrate 15.

The column 16 is formed integrally of a plurality of cylindrical portions 16a, a connection plate portion 16b that connects the plurality of cylindrical portions 16a, and a column rear end portion 16c having a truncated cone shape that protrudes rearwardly from a center of the connection plate portion 16b and is tapered in a rearward direction.

The screws 21 are inserted into the plurality of corresponding cylindrical portions 16a. The connection plate portion 16b is disposed between the first substrate 15 and the second substrate 17, and is a partition plate that is disposed at a distance from the first substrate 15 and the second substrate 17. Such a connection plate portion 16b is provided to thereby facilitate air flow generated around the first substrate 15 and the second substrate 17, enhance the heat dissipation from the plurality of electronic components attached to the first substrate 15 and the plurality of LED chips 25 attached to the second substrate 17, and separate the heat of the first substrate 15 side from the heat of the second substrate 17 side.

The second substrate 17 is formed in a flat plate shape to extend to the vicinity of the wide width portion 11b of the housing 11, and the plurality of LED chips 25 are attached to the left side and the right side of the rear surface 17a of the second substrate 17. In the second substrate 17, a positioning hole 17b is formed outside in the vehicle width direction of the cylindrical portion 16a of the column 16, and a positioning piece 16d is inserted into the positioning hole 17b, the positioning piece 16d extending integrally rearwardly from the connection plate portion 16b of the column 16 so that the second substrate 17 is positioned with respect to the column 16.

The inner lens 18 is made of colorless and transparent resin, and includes a cup-shaped inner lens center portion 18a that houses the third substrate 19, and an inner lens left portion 18b and an inner lens right portion 18c that are formed on a left side in the vehicle width direction and on a right side in the vehicle width direction with respect to the inner lens center portion 18a, respectively.

The inner lens center portion 18a includes a bottom wall 18d that is fastened with the plurality of screws 21, and a peripheral wall 18e that extends rearwardly from the peripheral edge of the bottom wall 18d. The bottom wall 18d includes a through hole 18f that is provided in a center portion of the bottom wall 18d, and a plurality of recesses 18g that are provided around the through hole 18f. A head 21a of the screw 21 is inserted into the recess 18g. The third substrate 19 is disposed inside the peripheral wall 18e.

Each of the inner lens left portion 18b and the inner lens right portion 18c of the inner lens 18 integrally includes a rear wall 18h that extends outwardly in the vehicle width direction from the peripheral wall 18e of the inner lens center portion 18a, a side wall 18j that extends forward from an edge outside in the vehicle width direction of the rear wall 18h, and a top wall 18k (see FIG. 5) and a bottom wall that extend forward from the upper edge and the lower edge of the rear wall 18h, respectively.

Each of the inner lens left portion 18b and the inner lens right portion 18c is a recessed portion that is surrounded by the above-described peripheral wall 18e, rear wall 18h, side wall 18j, top wall 18k and bottom wall.

A lens cut portion 18p that has been subjected to lens cut processing is provided in a front surface 18n of the rear wall 18h.

In a rear view, the lens cut portion 18p provided in each of the inner lens left portion 18b and the inner lens right portion 18c is provided in a position that does not overlap with the lens cut portion 12z of the outer lens 12. The left and right lens cut portions 18p, 18p each are a portion through which light emitted from the plurality of LED chips 25 is transmitted and that refracts the light in a predetermined direction. The light that has been transmitted through the rear walls 18h, 18h including the left and right lens cut portions 18p, 18p is further transmitted through the left rear wall 12u and the right rear wall 12v of the outer lens 12, and illuminates outside.

The third substrate 19 is provided with the plurality of LED chips 26 in a rear surface 19a of the third substrate 19, and a screw 22 is inserted into a screw insertion hole 19b that is formed at a center of the third substrate 19, so that the third substrate 19 is fastened to the column rear end portion 16c of the column 16 with the screw 22. An outer shape of the third substrate 19 is smaller than that of the lens cut portion 12z, so that a contour of the third substrate 19 is disposed inside the contour of the lens cut portion 12z of the outer lens 12 in a rear view.

As illustrated in FIG. 6, the connection plate portion 16b of the column 16 is formed integrally with a reflector 16e that faces downward, and is concavely curved below the connection plate portion 16b. The light transmitting portion 12m (see FIG. 4) of the outer lens 12 is disposed below the reflector 16e.

A plurality of LED chips 28 (or a single LED chip 28) are attached to a center portion of a front surface 17c of the second substrate 17. The LED chip 28 is connected to the electronic component 27, to be turned on by the electronic component 27.

The light emitted from the plurality of LED chips 28 is directed toward the lower side by the reflector 16e, and transmits through the light transmitting portion 12m to illuminate the license plate.

Each of the above-described plurality of LED chips 25, 26, 28 is connected to the electronic component 27 through a wire 31.

As illustrated in FIG. 5 and FIG. 6 above, in the tail light 10 serving as a light device that includes the LED chips 25, 26, 28 serving as light sources, the electronic components 27 serving as electrical elements to turn on the LED chips 25, 26, 28, and the first substrate 15, the second substrate 17, and the third substrate 19 on which the LED chips 25, 26, 28 and the electronic components 27 are disposed, a plurality of the first substrate 15, the second substrate 17, and the third substrate 19 are independently provided, and are disposed to be spaced from one another.

According to this configuration, the plurality of the first substrate 15, the second substrate 17, and the third substrate 19 are separately located, which allows heat sources (i.e., LED chips 25, 26, 28) to be kept isolated so as to suppress the heat influence. The first substrate 15, the second substrate 17, and the third substrate 19 are disposed spaced from one another, which can facilitate air flow generated around the first substrate 15, the second substrate 17, and the third substrate 19, and lead to further suppression of the heat influence due to heat generation of the LED chips 25, 26, 28.

As illustrated in FIG. 5, since the first substrate 15, the second substrate 17, and the third substrate 19 are fixed to the column 16, and the connection plate portion 16b is fixed to the column 16, and serves as a partition portion disposed between the first substrate 15 and the second substrate 17, provision of the connection plate portion 16b allows for further isolation of heat sources and further suppression of the heat influence.

Since the tail light 10 includes the housing 11 that supports the column 16, the outer lens 12 that, together with the housing 11, forms the housing portion 13 for housing the first substrate 15, the second substrate 17, and the third substrate 19, and the inner lens 18 that is provided inside the outer lens 12, and is disposed between the second substrate 17 and the third substrate 19 and supported by the column 16, the inner lens 18 can be utilized as a partition plate for the first substrate 15, the second substrate 17, and the third substrate 19, and isolation of the heat sources can be attained by the inner lens 18. In this way, the heat influence can be further suppressed. The inner lens also serves as a partition plate, and a support member becomes unnecessary as compared to the case where a special support member for the inner lens 18 is additionally provided, which can reduce the number of components and the cost of the tail light 10.

As illustrated in FIG. 2 and FIG. 5, since the outer lens 12 includes the lens cut portion 12z that is a part of the outer lens 12 and that has been subjected to lens cut processing, and the inner lens 18 includes the lens cut portions 18p in a position that does not overlap with the lens cut portion 12z of the outer lens 12 in a rear view, the light emitted from the tail light 10 can be differentiated between the inner lens 18 and the outer lens 12, thereby improving the visibility and giving the new impression.

As illustrated in FIG. 3, FIG. 4, and FIG. 6, the outer lens 12 is a tail lamp, and includes the light transmitting portion 12m in a part of the bottom surface of the outer lens 12, the light transmitting portion 12m transmitting the light of the LED chips 28 to illuminate the license plate 50 (see FIG. 1) attached to a rear portion of the vehicle body, and a rear edge 11d2 as a boundary between the light transmitting portion 12m and a lower portion of the housing 11 is located in front of a rear edge 11d1 with respect to the vehicle body, the rear edge 11d1 serving as an upper boundary between the outer lens 12 and the housing 11. Consequently, an area in which the license plate 50 can be illuminated is increased, which enables good illumination for the license plate 50.

As illustrated in FIG. 2 and FIG. 5, in a rear view, the lens cut portion 12z is provided in the center portion of the outer lens 12, the lens cut portions 18p are provided in the inner lens 18 on both sides of the lens cut portion 12z of the outer lens 12, and the third substrate 19 disposed between the outer lens 12 and the inner lens 18 is disposed on the inner side of the contour of the lens cut portion 12z of the outer lens 12, which allows for miniaturization of the third substrate 19 and emission of the light from the tail light 10 with the light emitted from the LED chips 26 to the lens cut portion 12z of the outer lens 12 being diffused, the LED chips 26 being provided on the third substrate 19 disposed between the outer lens 12 and the inner lens 18. In this way, the visibility of the tail light 10 from persons behind the vehicle can be improved.

The above-described embodiment absolutely presents one embodiment of the present invention. Various design modification and application may be optionally made within the scope not departing from the gist of the present invention.

For example, in the above-described embodiment, as illustrated in FIG. 4, the light transmitting portion 12m is formed integrally with the bottom surface 12B of the outer lens 12, but the present invention is not limited to this embodiment, and a light transmitting portion provided separately from the outer lens may be attached to the bottom of the outer lens. A plate-like light transmitting portion may be formed integrally with the lower portion of the reflector 16e of the column 16, or a separate light transmitting portion may be attached to the lower portion of the reflector 16e.

As illustrated in FIG. 5, the connection plate portion 16b is formed integrally with the column 16, but the present invention is not limited to this embodiment, and a connection plate portion (partition portion) separate from a column may be attached to the column 16.

REFERENCE SIGNS LIST

10 Tail light (light device)
11 Housing
11d Rear edge (boundary)
11d1 Upper rear edge (upper boundary)
11d2 Lower rear edge (boundary)
12 Outer lens
12z, 18p Lens cut portion
13 Housing portion
15 First substrate (substrate)
16 Column
16b Connection plate portion (partition portion)
17 Second substrate (substrate)
18 Inner lens
19 Third substrate (substrate)
25, 26, 28 LED chip (light source)
27 Electronic component (electrical element)
50 License plate

The invention claimed is:

1. A light device, comprising:
a light source;
an electrical element that turns on the light source;
substrates on which the light source and the electrical element are disposed, a plurality of the substrates being independently provided, and being disposed to be spaced from one another;
a column to which the substrates are fixed;
a housing that supports the column;
an outer lens that, together with the housing, forms a housing portion for housing the plurality of substrates; and
an inner lens that is provided inside the outer lens, and is disposed between the plurality of substrates and supported by the column,
wherein
the outer lens includes a lens cut portion that is a part of the outer lens and that has been subjected to lens cut processing, and the inner lens includes a lens cut portion in a position that does not overlap with the lens cut portion of the outer lens in a rear view,
in the rear view, the lens cut portion of the outer lens is provided in a center portion of the outer lens, the lens cut portion of the inner lens is provided in the inner lens on both sides of the lens cut portion of the outer lens, and the substrate disposed between the outer lens and the inner lens is disposed on an inner side of a contour of the lens cut portion of the outer lens.

2. The light device according to claim 1, further comprising:
a partition portion that is fixed to the column, and is disposed between the plurality of substrates.

3. The light device according to claim 1, wherein
the outer lens is a tail lamp, and includes a light transmitting portion in a part of a bottom surface of the outer lens, the light transmitting portion transmitting light of the light source to illuminate a license plate attached to a rear portion of a vehicle body, and
a boundary between the light transmitting portion and a lower portion of the housing is located in front of an upper boundary with respect to the vehicle body, the upper boundary being provided between the outer lens and the housing.

* * * * *